United States Patent
Colombo et al.

(10) Patent No.: US 11,938,715 B2
(45) Date of Patent: Mar. 26, 2024

(54) SP²-BONDED CARBON STRUCTURES

(71) Applicant: TEXAS INSTRUMENTS INCORPORATED, Dallas, TX (US)

(72) Inventors: Luigi Colombo, Dallas, TX (US); Nazila Dadvand, Richardson, TX (US); Benjamin Stassen Cook, Addison, TX (US); Archana Venugopal, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 989 days.

(21) Appl. No.: 16/229,668

(22) Filed: Dec. 21, 2018

(65) Prior Publication Data
US 2019/0202174 A1    Jul. 4, 2019

Related U.S. Application Data

(60) Provisional application No. 62/611,347, filed on Dec. 28, 2017.

(51) Int. Cl.
*B32B 9/00* (2006.01)
*B32B 9/04* (2006.01)
(Continued)

(52) U.S. Cl.
CPC .............. *B32B 9/007* (2013.01); *B32B 9/041* (2013.01); *B32B 9/045* (2013.01); *C01B 32/184* (2017.08); *C01B 32/19* (2017.08); *C23C 18/32* (2013.01); *C23C 18/38* (2013.01); *H01M 50/00* (2021.01); *B32B 2305/38* (2013.01); *B32B 2457/14* (2013.01); *B82Y 30/00* (2013.01); *C01P 2002/20* (2013.01); *Y10T 428/30* (2015.01)

(58) Field of Classification Search
CPC ....... Y10T 428/30; B82Y 30/00; B82Y 40/00; Y10S 977/742
USPC .......................................... 428/408
See application file for complete search history.

(56) References Cited

U.S. PATENT DOCUMENTS 7,653,279 B1   1/2010   Jacobsen
8,906,593 B1   12/2014  Nowak et al.
(Continued)

FOREIGN PATENT DOCUMENTS

RU         2577273 C1      3/2016
WO       2016080910 A1     5/2016

OTHER PUBLICATIONS

International Search Report for PCT/US2018/067997 dated Apr. 4, 2019.
(Continued)

*Primary Examiner* — Daniel H Miller
(74) *Attorney, Agent, or Firm* — Ray A. King; Frank D. Cimino

(57) ABSTRACT

A microstructure comprises a plurality of interconnected units wherein the units are formed of graphene tubes. The graphene tubes may be formed by photo-initiating the polymerization of a monomer in a pattern of interconnected units to form a polymer microlattice, removing unpolymerized monomer, coating the polymer microlattice with a metal, removing the polymer microlattice to leave a metal microlattice, depositing graphitic carbon on the metal microlattice, converting the graphitic carbon to graphene, and removing the metal microlattice.

6 Claims, 3 Drawing Sheets

(51) Int. Cl.
    *C01B 32/184*     (2017.01)
    *C01B 32/19*     (2017.01)
    *C23C 18/32*     (2006.01)
    *C23C 18/38*     (2006.01)
    *H01M 50/00*     (2021.01)
    *B82Y 30/00*     (2011.01)

(56) References Cited

U.S. PATENT DOCUMENTS

| | | | |
|---|---|---|---|
| 9,415,562 | B1 | 8/2016 | Schaedler et al. |
| 10,748,999 | B2 | 8/2020 | Cook et al. |
| 10,804,201 | B2 | 10/2020 | Venugopal |
| 11,390,527 | B2 | 7/2022 | Cook et al. |
| 2005/0271881 | A1* | 12/2005 | Hong ............... C08G 18/3821 528/49 |
| 2006/0148963 | A1 | 7/2006 | Dion et al. |
| 2006/0186502 | A1* | 8/2006 | Shimotani ........... H01L 51/0049 257/458 |
| 2007/0199826 | A1* | 8/2007 | Son ....................... C25D 15/02 205/238 |
| 2010/0143701 | A1 | 6/2010 | Zhu et al. |
| 2012/0261673 | A1 | 10/2012 | Schulze et al. |
| 2013/0115462 | A1* | 5/2013 | Mazyar ............ C10M 171/001 977/773 |
| 2013/0189444 | A1 | 7/2013 | Kub et al. |
| 2013/0230722 | A1 | 9/2013 | Fujii et al. |
| 2014/0140647 | A1 | 5/2014 | Saxton |
| 2014/0151111 | A1* | 6/2014 | Shah ..................... H05K 9/009 427/457 |
| 2014/0315093 | A1 | 10/2014 | Greer et al. |
| 2015/0176132 | A1 | 6/2015 | Hundley et al. |
| 2016/0304346 | A1 | 10/2016 | Zhang et al. |
| 2017/0044016 | A1 | 2/2017 | Smith et al. |
| 2017/0082569 | A1 | 3/2017 | Sommer et al. |
| 2017/0200909 | A1 | 7/2017 | Sonkusale et al. |
| 2017/0278930 | A1 | 9/2017 | Ruhl et al. |
| 2018/0088462 | A1 | 3/2018 | Vyatskikh et al. |
| 2019/0013386 | A1 | 1/2019 | Shinohara et al. |

OTHER PUBLICATIONS

International Search Report for PCT/US2018/068171 dated Apr. 18, 2019.
Xiaoyu Zheng et al., Ultralight, Ultrastiff Mechanical Metamaterials; Science 344 (2014) 1373-1377.
T. A. Schaedler, et al., Ultralight Metallic Microlattices; Science 334 (2011) 962-965.
Y. T. Liang, et al., Towards Rationally Designed Graphene-Based Materials and Devices, Macromol. Chem. Phys. 213 (2012) 1091-1100.
Li, et al. "High-Density Three-Dimension Graphene Macroscopic Objects for High-Capacity Removal of Heavy Metal Ions," Scientific Reports | 3: 2125 | DOI: 10.1038/srep02125, 2013,6 pages.

* cited by examiner

SP²-BONDED CARBON STRUCTURES

CROSS-REFERENCE TO RELATED APPLICATIONS

This application claims priority to U.S. Provisional Patent Application No. 62/611,347 filed on Dec. 28, 2017. This application is related to the application entitled "Multi-layered sp²-Bonded Carbon Tubes" filed concurrently herewith which claims priority to U.S. Provisional Patent Application No. 62/611,483 filed on Dec. 28, 2017, and to the application entitled "Hexagonal Boron Nitride Structures" filed concurrently herewith which claims priority to U.S. Provisional Patent Application No. 62/611,499 filed on Dec. 28, 2017, and to the application entitled "Multi-Super Lattice For Switchable Arrays" filed concurrently herewith, and to the application entitled "Filler Particles For Polymers" filed concurrently herewith which claims priority to U.S. Provisional Patent Application No. 62/611,511 filed on Dec. 28, 2017, and to the application entitled "Gas Sensor With Superlattice Structure" filed concurrently herewith which claims priority to U.S. Provisional Patent Application No. 62/611,554 filed on Dec. 29, 2017, the contents of which are hereby incorporated by reference in their entireties.

FEDERALLY SPONSORED RESEARCH OR DEVELOPMENT

Not Applicable

BACKGROUND

Graphene is a single-layer sp²-hybridized 2D network of carbon atoms that conceptually serves as the basis of many important allotropes of carbon. It can be stacked to form 3D graphite, rolled to form 1D carbon nanotubes, and fused to form 0D fullerenes. Owing to its strongly delocalized electron configuration, graphene exhibits exceptional charge carrier mobility, thermal conductivity, mechanical strength, and chemical stability. However, like other nanomaterials, the properties of graphene depend on its size, atomic structure, and physical environment. Graphene and graphene-based materials have tailorable properties that can be exploited in a broad range of devices, including transistors, capacitors, electron field emitters, transparent conductors, sensors, catalysts, and drug delivery agents. Other 2D crystals, most notably boron nitride and molybdenum disulfide, have also been isolated.

Two-dimensional (2D) sp²-bonded carbon exists in the form of graphene, buckyballs and carbon nanotubes (CNTs). Graphene is "flat" or 2D, fullerenes ("Buckyballs") are spherical or 0D, and CNTs are tubes in 1D. Forming these materials in a singular, regular, repeatable structure has not previously been achieved. Superstructures of these materials may provide very strong, light, highly thermally and electrically conductive structures. Attempts have been made to fabricate sp²-bonded sponges as shown in FIG. 1A, however these structures are irregular with properties that vary with position.

The isolation of graphene via the mechanical exfoliation of graphite has sparked strong interest in two-dimensional (2D) layered materials. The properties of graphene include exceptional strength, and high electrical and thermal conductivity, while being lightweight, flexible and transparent. This opens the possibility of a wide range of potential applications, including high-speed transistors and sensors, barrier materials, solar cells, batteries, and composites.

Other classes of 2D materials of interest include transition metal dichalcogenide (TMDC) materials, hexagonal boron nitride (h-BN), as well as those based on Group 14 elements, such as silicene and germanene. The properties of these materials can range from semi-metallic, for example, NiTe2 and VSe2, to semiconducting, for example, WSe2 and MoS2, to insulating, for example, hexagonal boron nitride (h-BN).

Growth of regular 3D superstructures using sp²-bonded carbon may address the shortcomings of the flexible sp² carbons for 3D applications given that hexagonally arranged carbon is strong, chemically inert, electrically and thermally conductive, and optically transparent. Such 3D superstructures may find used in many applications from packaging, thin optically transparent electrically conductive strong thin films, and many more.

When a carbon atom is attached to three groups (or, as in the case of graphene, three other carbon atoms) and so is involved in three a bonds, it requires three orbitals in the hybrid set. This requires that it be sp² hybridized. An sp²-hybridized bond has 33% s and 67% p character. The three sp² hybrid orbitals point towards the corners of a triangle at 120° to each other. Each sp² hybrid is involved in a σ bond. The remaining p orbital forms the 7 bond. A carbon double bond may be viewed as a σ+π bond.

BRIEF SUMMARY

In one example, a microstructure comprises a plurality of interconnected units wherein the units are formed of graphene tubes. The graphene tubes that form the microstructure may be arranged in an ordered structure and form symmetric patterns that repeat along the principal directions of three-dimensional space. The microstructure may comprise a plurality of interconnected units including at least a first unit formed of first graphene tubes; and a second unit formed of second graphene tubes wherein one or more of the second graphene tubes are connected to one or more of the first graphene tubes.

A method of forming a graphene microstructure is disclosed herein which comprises: photo-initiating the polymerization of a monomer in a pattern of interconnected units to form a polymer microlattice; removing unpolymerized monomer; coating the polymer microlattice with a metal; removing the polymer microlattice to leave a metal microlattice; depositing graphitic carbon on the metal microlattice; converting the graphitic carbon to graphene; and removing the metal microlattice.

BRIEF DESCRIPTION OF THE SEVERAL VIEWS OF THE DRAWING(S)

DETAILED DESCRIPTION

Figure 1A:
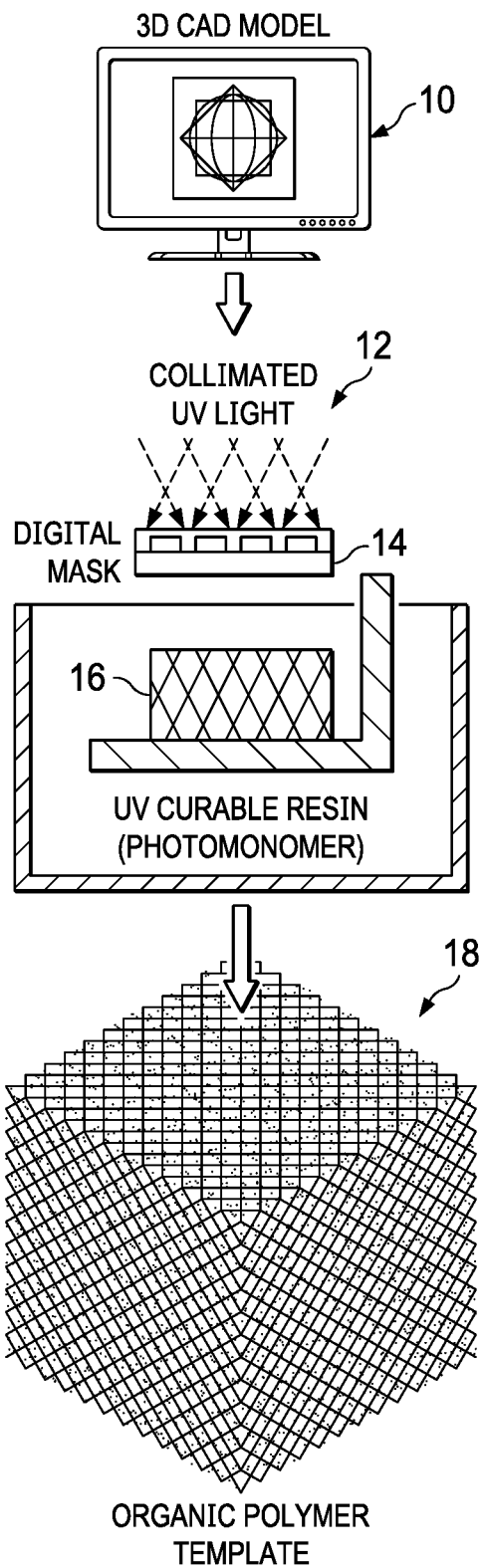
FIG. 1A is a schematic drawing of a fabrication process for a metal-based microlattice template in accordance with an example.

It has been found that an organic/inorganic superstructure may be used as a template for the formation of a 3D metal superstructure that may then be used to grow graphitic carbon on the surface of the metal. The template may be fabricated through a self-propagating photopolymer waveguide technique (see, e.g., Xiaoyu Zheng et. al., Ultralight, Ultrastiff Mechanical Metamaterials; *Science* 344 (2014) 1373-1377 and T. A. Schaedler, et al., Ultralight Metallic Microlattices; *Science* 334 (2011) 962-965). As illustrated schematically in FIG. 1A, an interconnected 3D photopolymer lattice may be produced upon exposure of an appropriate liquid photomonomer 16 to collimated UV light 12 through a specifically designed (e.g. using a computer-aided design model 10) digital mask 14 that contains openings with certain spacing and size. The fabricated organic polymer template microlattice 18 may then be coated by electroless copper or other suitable metal (e.g. Ni, Co, Au, Ag, Cu, and alloys thereof) followed by etching away the organic polymeric matrix (scaffold). The resulting metal-based microlattice may be then used as a template to grow the graphitic carbon. The thickness of the electroless plated metal may be controlled in the range of nanometer to micrometer by adjusting the plating time, temperature, and/or plating chemistry.

FIG. 1A schematically illustrates an exemplary fabrication process of organic polymeric microlattices (scaffolds) 18 prior to coating with electroless plating.

FIG. 1A schematically illustrates an exemplary fabrication process of organic polymeric microlattices (scaffolds) prior to coating with electroless plating.

The present disclosure is of a "periodically structured" carbon nanostructure. The carbon nanostructures of the prior art are irregular and have much larger dimensions than those which may be achieved using the methodology disclosed herein.

The present process may be used to create a regular array, and the superstructure dimensions (unit) and structure may be optimized for strength, thermal and other fundamental properties.

There are several aspects of this procedure that are noteworthy:
- it provides a regular structure with defined dimensions;
- it can form very thin metal (e.g. Ni, Co, Cu, Ag, Au) microlattices;
- it enables the formation of graphitic carbon on very thin metals by a surface-limited process for very thin metal wires or tubes.

The present process uses a polymeric structure as a template for such fabrication with the subsequent formation of a metal superstructure that may then be exposed to a hydrocarbon (e.g. methane, ethylene, acetylene, benzene) to form graphitic carbon, followed by etching of the metal from under the graphitic carbon using appropriate etchants such as, for example, $FeCl_3$ or potassium permanganate.

Collimated UV light 12 through a photomask 14 or multi-photon lithography may be used in a photo-initiated polymerization to produce a polymer microlattice 18 comprised of a plurality of interconnected units. Exemplary polymers include polystyrene and poly(methyl methacrylate) (PMMA). Once polymerized in the desired pattern, the remaining un-polymerized monomer may be removed.

The polymer structure (polymer scaffold) may then be plated with a suitable metal using an electroless plating process.

Electroless nickel plating (EN) is an auto-catalytic chemical technique that may be used to deposit a layer of nickel-phosphorus or nickel-boron alloy on a solid workpiece, such as metal, plastic, or ceramic. The process relies on the presence of a reducing agent, for example hydrated sodium hypophosphite ($NaPO_2H_2 \cdot H_2O$) which reacts with the metal ions to deposit metal. Alloys with different percentages of phosphorus, ranging from 2-5 (low phosphorus) to up to 11-14 (high phosphorus) are possible. The metallurgical properties of the alloys depend on the percentage of phosphorus.

Electroless plating has several advantages over electroplating. Free from flux-density and power supply issues, it provides an even deposit regardless of workpiece geometry, and with the proper pre-plate catalyst, may deposit on non-conductive surfaces. In contradistinction, electroplating can only be performed on electrically conductive substrates.

Before performing electroless plating, the material to be plated must be cleaned by a series of chemicals; this is known as the pre-treatment process. Failure to remove unwanted "soils" from the part's surface results in poor plating. Each pre-treatment chemical must be followed by water rinsing (normally two to three times) to remove chemicals that may adhere to the surface. De-greasing removes oils from surfaces, whereas acid cleaning removes scaling.

Activation may be done with an immersion into a sensitizer/activator solution—for example, a mixture of palladium chloride, tin chloride, and hydrochloric acid. In the case of non-metallic substrates, a proprietary solution is often used.

The pre-treatment required for the deposition of metals on a non-conductive surface usually consists of an initial surface preparation to render the substrate hydrophilic. Following this initial step, the surface may be activated by a solution of a noble metal, e.g., palladium chloride. Electroless bath formation varies with the activator. The substrate is then ready for electroless deposition.

The reaction is accomplished when hydrogen is released by a reducing agent, normally sodium hypophosphite (with the hydrogen leaving as a hydride ion) or thiourea, and oxidized, thus producing a negative charge on the surface of the part. The most common electroless plating method is electroless nickel plating, although silver, gold and copper layers can also be applied in this manner.

In principle, any hydrogen-based reducing agent can be used although the redox potential of the reducing half-cell must be high enough to overcome the energy barriers inherent in liquid chemistry. Electroless nickel plating most often employs hypophosphite as the reducer while plating of other metals like silver, gold and copper typically makes use of low-molecular-weight aldehydes.

A benefit of this approach is that the technique can be used to plate diverse shapes and types of surfaces.

Figure 1B:
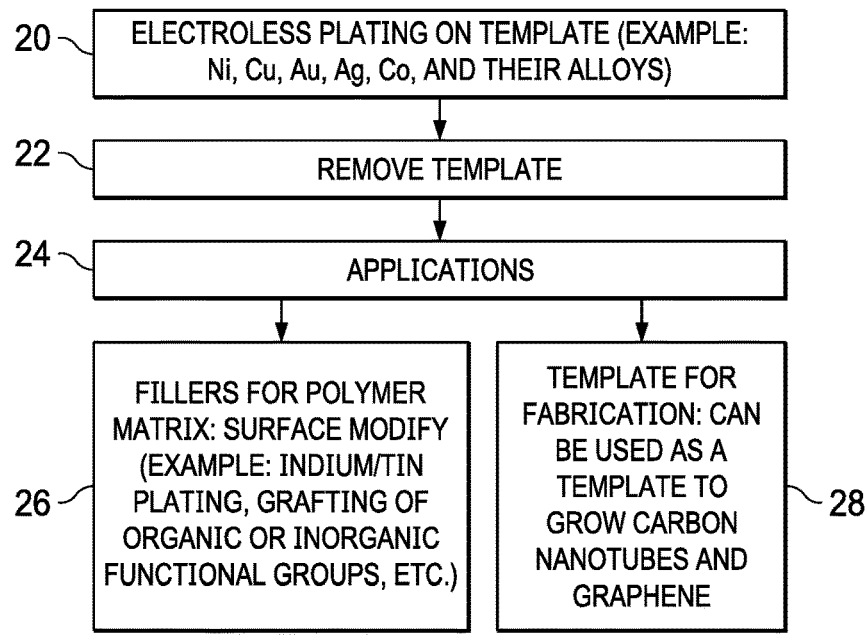
FIG. 1B is a flowchart for the fabrication process depicted schematically in FIG. 1A.
Figure 2:
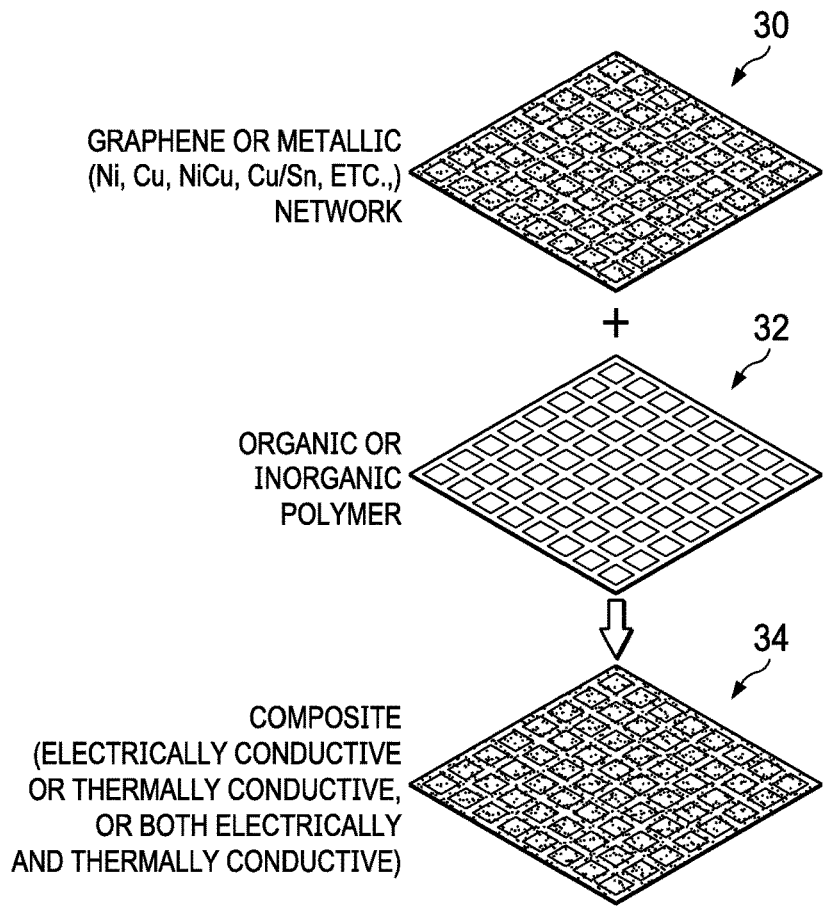
FIG. 2 is a schematic diagram of the fabrication of an electrically, thermally, or both thermally and electrically conductive composite by embedding a fabricated metal-based or graphene-based microlattice within an organic polymer matrix.

As illustrated in FIG. 1B, the organic polymeric microlattice may be electrolessly plated 20 with metal followed by dissolving out 22 the organic polymer scaffold. The resulting metal-based microlattice may be used in several applications 24—e.g. it may then be coated with a thin layer of immersion tin to prevent the metal from oxidizing during the subsequent process which may include a heat treatment. Alternatively, the surface of the metal-based microlattice may be functionalized with appropriate functional groups 26 to provide anchoring or reactions sites for subsequent interaction with a polymer matrix. A copper/nickel super-lattice may be used. The fabricated and surface-treated metallic network 30 may be embedded within an organic polymeric matrix 32 to fabricate an electrically or thermally or both an electrically and thermally conductive composite 34 (see FIG. 2). Alternatively, the fabricated metal-based microlattice may be used as a template 28 to synthesize a graphitic carbon superstructure. The metal may then be etched out to produce a graphene microstructure comprising a plurality of interconnected units wherein the units are formed of graphene tubes that are interconnected by chemical electronic bonds (as distinguished from van der Waals forces which may cause carbon nanotubes to agglomerate).

Figure 3:
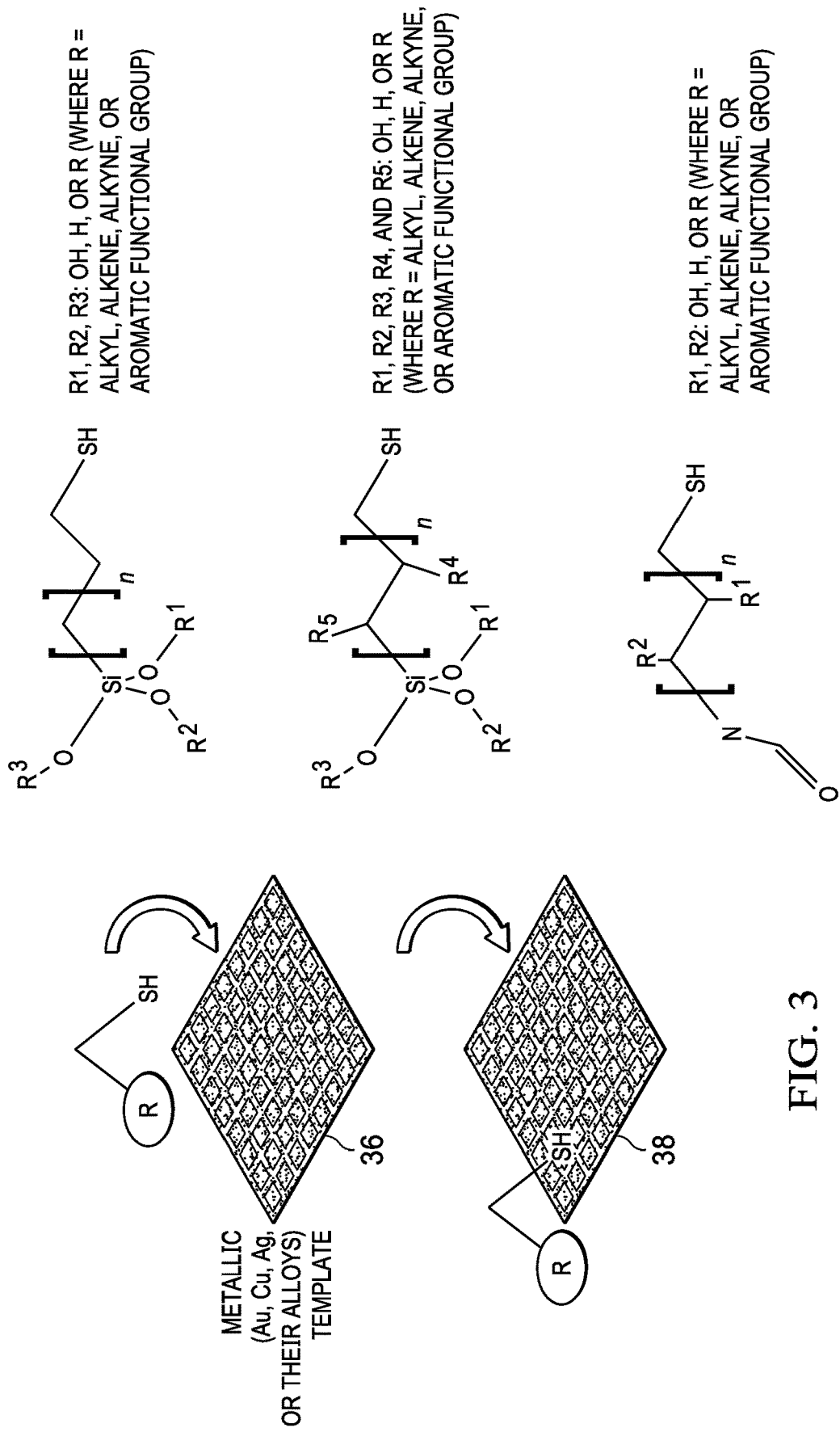
FIG. 3 is a schematic diagram of a surface functionalization methodology for functionalizing a fabricated metal-based microlattice.

FIG. 3 schematically illustrates a surface treatment methodology for functionalizing the fabricated metal-based microlattice. As it can be seen, the surface of the metal microlattice 36 may be exposed to a mercaptan-based compound. The mercaptan-based compound may be a hydroxylated alkyl mercaptan such as 3-mercapto-1,2 dihydroxy propane or it may be based on an isocyanate function group such as isocyanate alkyl trialkoxy silane. The mercaptan-based compound bonds to the metal (such as e.g. copper, silver or gold) through the sulfur atom of the mercapto moiety resulting in a hydroxylated metal surface 38. The hydroxyl functional groups implanted on the metal surface may then be reacted with a reactive functional group from the pre-polymer matrix. In the case of isocyanate-based mercaptan compounds, the free isocyanate functional groups may subsequently be reacted with certain functional groups of the organic polymeric matrix such as —OH, —NH, etc. resulting in the formation of chemical bonds at the copper-organic polymer interface. The polymer for the composite may be selected for its mechanical properties and/or electronic properties. Exemplary polymers include fluorocarbons (such as polytetrafluoroethylene) and polybutadiene.

In an example, the growth of graphene on the metal tubes may be omitted to produce a mircolattice of interconnected metal tubes. A process for forming such a metal microstructure may comprise: photo-initiating the polymerization of a monomer in a pattern of interconnected units to form a polymer microlattice; removing unpolymerized monomer; coating the polymer microlattice with a metal; and removing the polymer microlattice to leave a microlattice of interconnected metal tubes in a pattern of interconnected units.

In another example, a metal/graphene microstructure of graphene-coated metal tubes in a pattern of interconnected units may be prepared by the process comprising the steps of: photo-initiating the polymerization of a monomer in a pattern of interconnected units to form a polymer microlattice; removing unpolymerized monomer; coating the polymer microlattice with a metal; removing the polymer microlattice to leave a metal microlattice; depositing graphitic carbon on the metal microlattice; and converting the graphitic carbon to graphene.

Modifications are possible in the described embodiments, and other embodiments are possible, within the scope of the claims.

What is claimed is:

1. A microstructure comprising:
   interconnected units including a first unit formed of first graphene tubes, and a second unit formed of second graphene tubes, wherein one or more of the second graphene tubes are connected to one or more of the first graphene tubes, the interconnected units forming a microlattice;
   wherein, the microlattice is electrolessly plated with metal followed by dissolving out an organic polymer scaffold, and a resulting metal-based microlattice is coated with a layer of immersion tin, and embedded within an organic polymeric matrix.

2. The microstructure of claim 1, wherein the graphene tubes are arranged in an ordered structure and form symmetric patterns that repeat along the principal directions of three-dimensional space.

3. The microstructure of claim 1, wherein the first and second graphene tubes form a rigid structure.

4. The microstructure of claim 1, wherein the microlattice is used as a template to synthesize an electrically or thermally conductive composite.

5. The microstructure of claim 1, wherein the graphene tubes are hollow.

6. The microstructure of claim 1, wherein the graphene tubes are interconnected by chemical electronic bonds.

\* \* \* \* \*